United States Patent [19]

Tanaka et al.

[11] Patent Number: 5,068,752

[45] Date of Patent: Nov. 26, 1991

[54] APPARATUS FOR RECORDING/REPRODUCING A DIGITAL AUDIO SIGNAL WITH A VIDEO SIGNAL

[75] Inventors: Hiroshi Tanaka, Moriguchi; Tetsuo Ishiwata, Suita; Shuzo Hitotsumachi, Yawata; Hitoshi Komae, Osaka; Susumu Yamaguchi, Moriguchi; Tadashi Yoshino; Eiji Yamauchi, both of Neyagawa, all of Japan

[73] Assignee: Matsushita Electric Industrial Co., Ltd., Osaka, Japan

[21] Appl. No.: 248,799

[22] Filed: Sep. 26, 1988

[30] Foreign Application Priority Data

Sep. 29, 1987 [JP] Japan .................................. 62-245107
Oct. 7, 1987 [JP] Japan .................................. 62-252892
Nov. 24, 1987 [JP] Japan .................................. 62-296933

[51] Int. Cl.⁵ .......................................... H04N 5/782
[52] U.S. Cl. ...................................... 360/32; 358/339; 360/19.1; 360/36.2
[58] Field of Search .................... 360/8, 18, 19.1, 26, 360/31, 32, 36.2, 39, 40, 42, 48; 358/313, 337, 339, 341, 343, 320; 369/59

[56] References Cited

U.S. PATENT DOCUMENTS

| | | | |
|---|---|---|---|
| 3,728,716 | 4/1973 | Jacoby et al. | 360/42 X |
| 4,110,785 | 8/1978 | Dischert et al. | 360/36.2 X |
| 4,120,000 | 10/1978 | Ninomiya . | |
| 4,268,867 | 5/1981 | Traino . | |
| 4,348,699 | 9/1982 | Tsuchiya et al. | 360/32 |
| 4,542,419 | 9/1985 | Morio et al. . | |
| 4,562,577 | 12/1985 | Glover et al. | 369/59 X |
| 4,604,658 | 8/1986 | Hibino et al. | 358/339 X |
| 4,660,103 | 4/1987 | Wilkinson et al. . | |
| 4,700,240 | 10/1987 | Umemoto et al. | 360/48 |
| 4,769,723 | 9/1988 | Tran | 360/42 X |

FOREIGN PATENT DOCUMENTS

| | | |
|---|---|---|
| 102600 | 3/1984 | European Pat. Off. . |
| 0222386 | 5/1987 | European Pat. Off. . |
| 0239326 | 9/1987 | European Pat. Off. . |
| 0276809 | 8/1988 | European Pat. Off. . |
| 2947874 | 6/1981 | Fed. Rep. of Germany . |
| 2165687 | 4/1986 | United Kingdom . |

OTHER PUBLICATIONS

Patent Abstracts of Japan, vol. 10, No. 32 (E-379) [2089], 2/7/86, & JP60-189326.

Primary Examiner—Roy N. Envall, Jr.
Assistant Examiner—W. R. Young
Attorney, Agent, or Firm—Stevens, Davis, Miller & Mosher

[57] ABSTRACT

A signal processing system for absorbing asynchronism between a video signal and an audio signal which is caused when a PCM audio signal is to be recorded together with the video signal on a helical scan-type tape recorder. When the video signal and the audio signal are recorded on the same track, a recording band width of the audio signal should be narrow. A sample pattern is provided which assures rapid pull-in for both data clock reproduction and carrier reproduction, when the audio signal is modulated by QPSK or when Q-QPSK modulation is used.

11 Claims, 11 Drawing Sheets

APPARATUS FOR RECORDING/REPRODUCING A DIGITAL AUDIO SIGNAL WITH A VIDEO SIGNAL

BACKGROUND OF THE INVENTION

1. Field of the Invention

The present invention relates to a technique for recording and reproducing digital audio signal by a helical scan type video tape recorder together with a video signal.

2. Description of Prior Art

In a conventional helical scan type video tape recorder, a servo system is designed to synchronize with a vertical synchronization signal of a video signal. Accordingly, if a digital signal having a sampling frequency of 48 kHz, for example, is to be recorded together with the video signal, the number of samples of a digital signal in one vertical period is given by $$48 \text{ K}/59.94 = 800.8$$

Accordingly, a method has been proposed (JP-A-61-233472) in which a data frame which can contain $800+\alpha$ samples in one vertical period is secured, the digital signal is sectioned by a period at which a vertical synchronization signal is synchronized with a sampling frequency of the digital signal to form one data frame, and it is recorded together with a rate signal representing the number of samples in one data frame. Assuming now that n samples of data are recorded in one frame, dummy data of "0" pattern is recorded for the remaining $800+\alpha-n$ samples of data in order to keep the record rate constant.

The above prior art digital signal recording/reproducing apparatus is explained with reference to drawings.

FIG. 3 shows a configuration of the prior art digital signal recording/reproducing apparatus. In FIG. 3, numeral 21 denotes an input terminal for a digital information signal, numeral 22 denotes a time axis converter, numeral 23 denotes an encoder, numeral 24 denotes a format controller, numeral 25 denotes a modulator, numeral 26 denotes a recording amplifier, numeral 27 denotes a rotating head, numeral 28 denotes a reproducing amplifier, numeral 29 denotes a demodulator, numeral 30 denotes a reverse-formatting controller, numeral 31 denotes a decoder, numeral 32 denotes a time axis reverse converter, numeral 33 denotes an output terminal for a digital information signal, numeral 34 denotes a switch, and a, b, and c respectively denote a head switching signal, a first rate discrimination signal and a second rate discrimination signal.

The operation of the above prior art digital signal recording/reproducing apparatus is now explained.

The digital information signal having a sampling frequency of 48 kHz applied to the input terminal 21 is sectioned in the time axis converter 22 by a period at which the head switching signal a synchronized with a vertical synchronization signal of the video signal is synchronized by a sampling clock so that it is divided into 800 or 801 samples of data frame Hereinafter, they are called frame A and frame B, respectively. Since the head switching signal is used as a reference, an average number of samples in one data frame is given by $$48 \text{ K}/59.94 = 800.8$$

In the frame A, dummy data is inserted to make the number of samples conform to that of the frame B. A first rate discimination signal b is produced as information representing the number of samples in one data frame. The data output of the time axis converter 22 is interleaved by the encoder 23, and redundant data for error correction is added The output of the encoder 23, together with the first rate discrimination signal b, are converted to a predetermined record format by the formatting controller 24 which compresses it into data period for each data frame In an ample period, a fixed pattern having a number of inverted edges after data modulation is produced by the formatting controller 24 so that the demodulator 31 can quickly pull in the clock synchronized with the recorded data in the reproduction mode. FIG. 10 shows a conceptual view of the ample period and the data period. The modulator 25 modulates the output of the formatting controller by 8-10 conversion or NRZ conversion, and the modulated data is supplied to the rotating head 27 through the recording amplifier 26 and the switch 34, and recorded on a magnetic tape.

In the reproduction mode, the signal reproduced by the rotating head 27 is supplied to the demodulator 29 through the switch 34 and the reproducing amplifier 28, and processed in the reverse manner by the demodulator 29, reverse-formatting controller 30, decoder 31 and time axis reverse converter, and a digital information signal is produced at the output terminal 33. The reverse-formatting controller 30 detects from the reproduced signal a second rate discrimination signal c which represents the number of samples in one data frame, and the reverse-time axis converter 32 determines the data frame as either A or B based on the second rate discrimination signal c and carries out the reverse-time axis conversion.

FIG. 4 shows a configuration of the reverse-time axis converter 32. In FIG. 4, numeral 41 denotes a buffer memory, numeral 42 denotes a frequency divider, numeral 43 denotes a phase comparator, numeral 44 denotes a low-pass filter and numeral 45 denotes a voltage controlled oscillator.

The operation of the time axis reverse converter 32 is explained with reference to FIG. 4. The digital information signal which has been error-corrected and decoded by the decoder 31 is temporarily stored in the buffer memory 41. The frequency divider 42 receives the second rate discriminator c and frequency-divides the output clock of the voltage controlled oscillator 45 by 801 for the data frame B and by 800 for the data frame A. The phase comparator 43 compares phases of the head switching signal a and the output of the frequency divider 42 and produces a voltage proportional to the phase difference. The low-pass filter 44 eliminates a high frequency component and the voltage controlled oscillator 45 has its oscillation frequency controlled by the output voltage of the low-pass filter 44. The digital information signal is read from the buffer memory 41 by the output clock of 48 kHz from the voltage controlled oscillator 45 reproduced by the phase synchronization loop comprising the frequency divider 42, the phase comparator 43, the low-pass filter 44 and the voltage controlled oscillator 45.

In the above conventional digital signal recording/reproducing apparatus, when the vertical synchronization signal of the video signal is at 59.94 Hz, the number of samples in one data frame is 800 or 801 in principle. However, since the reproduced video signal of the VTR includes jitter, the vertical synchronization signal deviates from 59.94 Hz and the error amounts up to 0.5% as the damping is repeated. If the digital signal is recorded together with such a video signal, the number of samples in one data frame may assume one of the following multiple values $$48 K/59.94 * (1 \pm 0.005) = 796 - 805$$

As a result, the rate information needs several bits to represent the multi-value information.

When the information thus recorded is reproduced, if the rate discrimination signal representing the number of samples is misdetected, for example, if the data frame having 800 samples is misdetected as the data frame having 801 samples, dummy data is included in the output digital audio data so that noise is generated.

In the time axis reverse converter, the phase synchronization loop for reproducing the sampling clock of 48 kHz of the digital data includes the frequency divider which has a large frequency division factor of around 800. As a result, a high loop gain is not attained and a phase pull-in time is long.

In addition, a band restriction condition is imposed because the recorded output of the digital signal recording/reproducing apparatus is recorded in the same track as the video signal track by frequency multiplexing or overwriting. Where a four-phase phase modulation (QPSK) or an offset four-phase phase modulation (O-QPSK) is used and a band-pass filter is used in the reproduction mode to pass only the predetermined frequency components to effect QPSK or O-QPSK demodulation, the following problems arise.

Assuming that $f_c$ is a carrier frequency for the QPSK or O-QPSK modulation, $f_s$ is a sampling frequency of digital data to be modulated, $f_c \pm f_B$ is a band-pass width of the band-pass filter (FIG. 5a) and an ample pattern is an all-"1" pattern, the band width after the modulation is given by $$f_c \pm \frac{f_s}{2}$$

(FIG. 5b). When $$f_B = \frac{f_s}{2},$$

the reproduced waveform cannot be extracted by the band-pass filter for the QPSK or O-QPSK demodulation because of group delay and phase distortion around a cutoff point of the band-pass filter. The QPSK or O-QPSK demodulation can be well attained if the ample pattern is an all-"0" pattern (which is all-"1" or all-"0" pattern after the NRZI conversion) because a spectrum after the modulation is that shown in FIG. 5c. However, the data clock is not reproduced because there is no reversal edge of a bit boundary in the reproduced data after the demodulation.

SUMMARY OF THE INVENTION

It is an object of the present invention provide a digital signal recording/reproducing apparatus which can simultaneously record a video signal and a digital signal in a helical scan type tape recorder while it absorbs asynchronism of the digital signal even if a vertical synchronization frequency of the video signal deviates from 59.94 Hz, and which, in the reproduction mode, if the discrimination of the rate discrimination signal which represents the number of samples, in one data frame is highly reliable and a misdiscrimination of the rate discrimination signal is made, processes data by regarding that data frame as a data frame having a minimum number of samples so that the generation of noise due to output of the dummy data is prevented even if the number of samples in one data frame is misdiscriminated.

It is another object of the present invention to provide a digital signal recording/reproducing apparatus having an ample pattern which is suitable for the QPSK or O-QPSK demodulation and for reproduction of a clock signal synchronized with the data after the demodulation.

It is another object of the present invention to provide a phase synchronization loop for reproducing a sampling clock of a time axis reverse converter, in which a phase pull-in time at the start of a circuit is short even if a frequency division factor is large.

In order to achieve the above objects, the digital signal recording/reproducing apparatus of the present invention comprises a time axis converter for receiving a digital information signal having an inherent sampling frequency, sectioning the digital information signal by a predetermined period related to a vertical synchronization signal of the video signal to form the digital information signal of each predetermined period into data frame having one of at least two numbers of samples, sequentially outputting data frames having the smaller number of samples with dummy data being added thereto in order to match the number of samples to the maximum number of samples, and producing a rate discrimination signal representing the number of samples of the digital information signal in the data frame; an encoder for receiving the data output of the time axis converter, interleaving the data output and adding error correction redundant data to the data output; a formatting controller for adding a header word including synchronization signal, block address and rate discrimination signal to each of m data blocks in one data frame; a reverse formatting controller for detecting m rate discrimination signals from m header words in one data frame; a discriminator for determining majority of the m rate discrimination signals, determining the number of samples in the data frame, and when the result of the majority process is questionable, outputting the smallest number of samples; and a time axis reverse converter for conducting a reverse process to that of the time axis converter in accordance with the output of the discriminator.

The formatting controller produces a predetermined fixed pattern during a predetermined period (ample period) including a switching point of a head of a helical scan type tape recorder and time-compresses the m data block header word during a period (data period) other than the ample period. The modulator includes a serial/parallel converter for converting the output of the formatting controller to 2-bit parallel data, first and second NRZI converters for NRZI-converting the 2-bit output of the serial/parallel converter, and a QPSK modulator for phase-modulating the outputs of the first and second NRZI converters by four-phase modulation or offset four-phase modulation. The predetermined fixed pattern is a repetitive pattern of n bits in which one odd bit and one even bit are "1" and the remaining bits are "0".

The time axis reverse converter comprises a phase synchronization loop for receiving the head switching signal of the helical scan type tape recorder and the number of samples of the data frame discriminated by the reverse formatting controller and producing a read clock, and a buffer memory for receiving the digital information signal having error thereof corrected by the decoder and outputting it at a timing of the read clock produced by the phase synchronization loop. The phase synchronization loop comprises a phase comparator for comparing phases of the head switching signal and the output signal of the frequency divider, an out-of-phase detector for detecting when a phase error between the head switching signal and the frequency divider output signal is larger than a predetermined level, a low-pass filter for limiting a band of the output of the phase comparator, a voltage controlled oscillator having an oscillation frequency thereof controlled by the output voltage of the low-pass filter for supplying the oscillation frequency to the frequency divider, the frequency divider for frequency-dividing the output of the voltage controlled oscillator by a frequency division factor determined by the number of samples of the data frame discriminated by the reverse formatting controller, and a clear controller for the frequency divider.

According to the present invention:

(1) The absorption ability to the asynchronism of the digital data for the video signal is high, the reliability of the rate discrimination signal in the reproduction mode is high, and the generation of noise due to introduction of the dummy data into the output digital signal is prevented even if the rate discrimination signal is misdiscriminated.

(2) The ample pattern which is suitable for the QPSK or O-QPSK demodulation and for the data clock reproduction after the demodulation is attained.

(3) In the time axis reverse converter, when the phase of the head switching pulse deviates significantly from the phase of the frequency divider output, the out-of-phase detector detects the out-of-phase condition, clears the count of the frequency divider, and releases the clear at the next phase lock point. Accordingly, the phase pull-in time is reduced.

DESCRIPTION OF THE PREFERRED EMBODIMENTS

Figure 1:
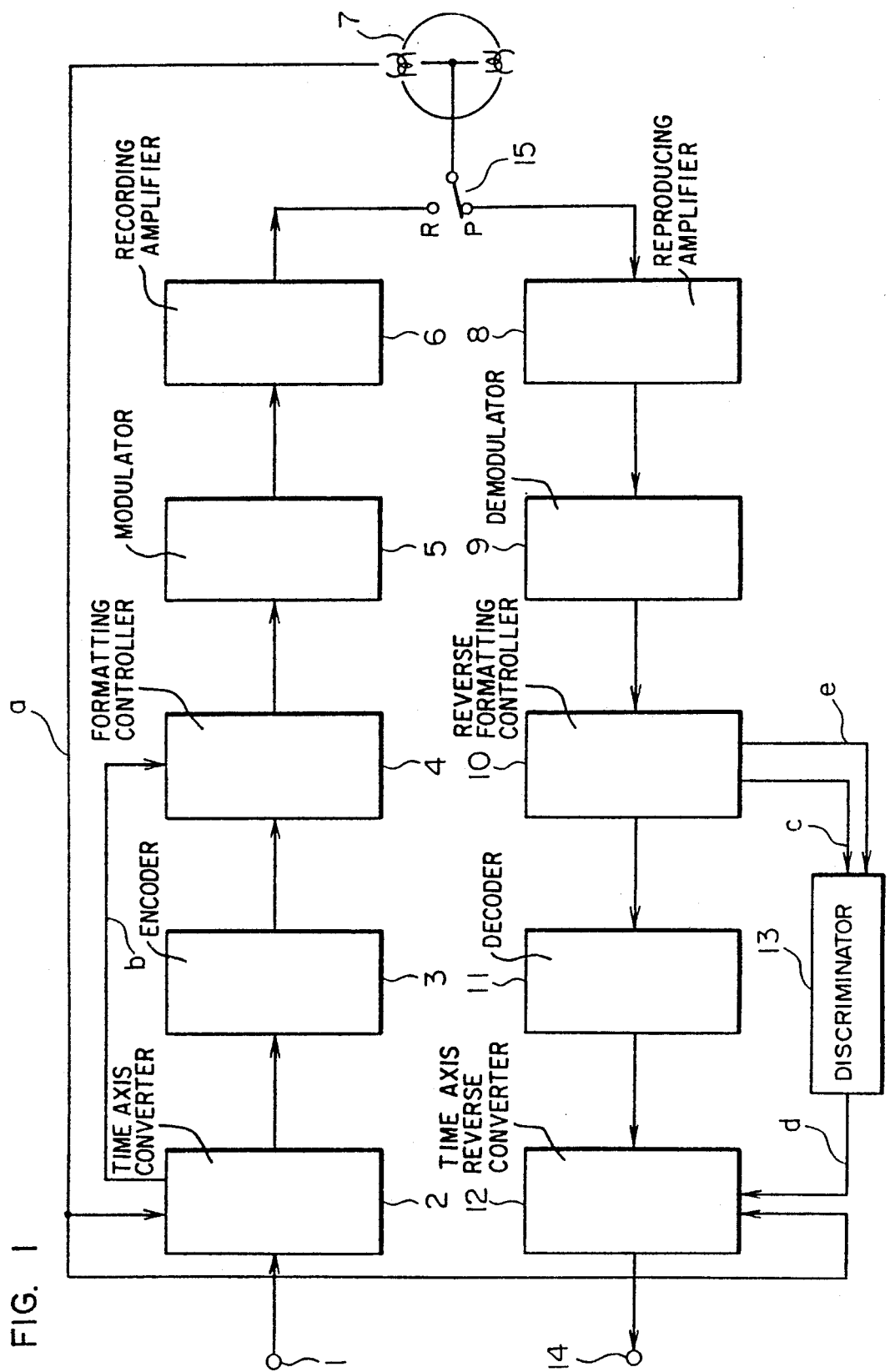
FIG. 1 shows a configuration of a first embodiment of a digital signal recording/reproducing apparatus of the present invention.

FIG. 1 shows a configuration of a first embodiment of a digital signal recording/reproducing apparatus of the present invention. In FIG. 1, numeral 1 denotes an input terminal for a digital information signal having an inherent sampling frequency, and numeral 2 denotes a time axis converter which sections the input digital information signal by a predetermined period related to a vertical synchronization signal of a video signal to form the digital information signal into data frames having at least two different numbers of samples for each predetermined period, sequentially outputs data frames having dummy data added thereto for the data frames having smaller numbers of samples so that the number of samples matches to that of the data frame having the maximum number of samples, and produces a rate discrimination signal representing the number of samples of the digital information signal in each data frame.

Numeral 3 denotes an encoder which receives the data output from the time axis converter 1 and interleaves the data output and adds error correction redundant data to the data output, numeral 4 denotes a formatting controller which adds a header word including a synchronization signal, a block address and the rate discrimination signal to each of m data block in each data frame, numeral 5 denotes a modulator which modulates the output of the formatting control circuit 4 by a predetermined modulation rule, numeral 6 denotes a recording amplifier, numeral 7 denotes a rotating head, numeral 8 denotes a reproducing amplifier, numeral 9 denotes a demodulator, numeral 10 denotes a reverse formatting control circuit for detecting m rate discrimination signals from m header words in one data frame, numeral 11 denotes a decoder, numeral 13 denotes a discriminator which determines majority of the m rate discrimination signals to determine the number of samples in the data frame, and if the result of the majority decision is questionable, outputs the minimum number of samples, numeral 12 denotes a time axis reverse converter which carries out the reverse process to that of the time axis converter 2 in accordance with the discrimination result, numeral 14 denotes a digital information signal output terminal, numeral 15 denotes a switch, and a, b, c, d and e denote head switching pulse, first, second and third rate discrimination signals, and parity check error detection signal, respectively.

Figure 2:
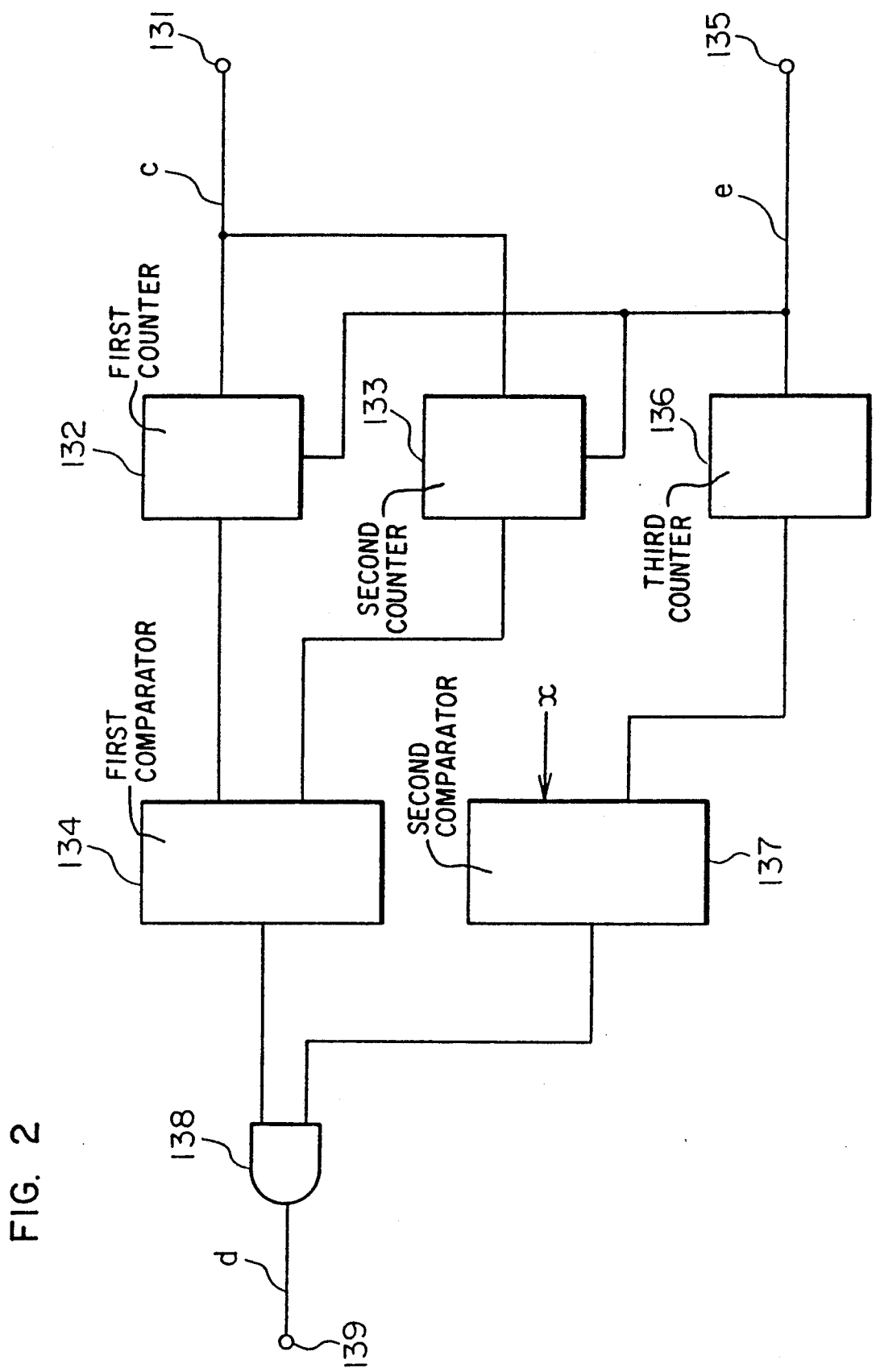
FIG. 2 shows a configuration of a discriminator of the first embodiment.
Figure 3:
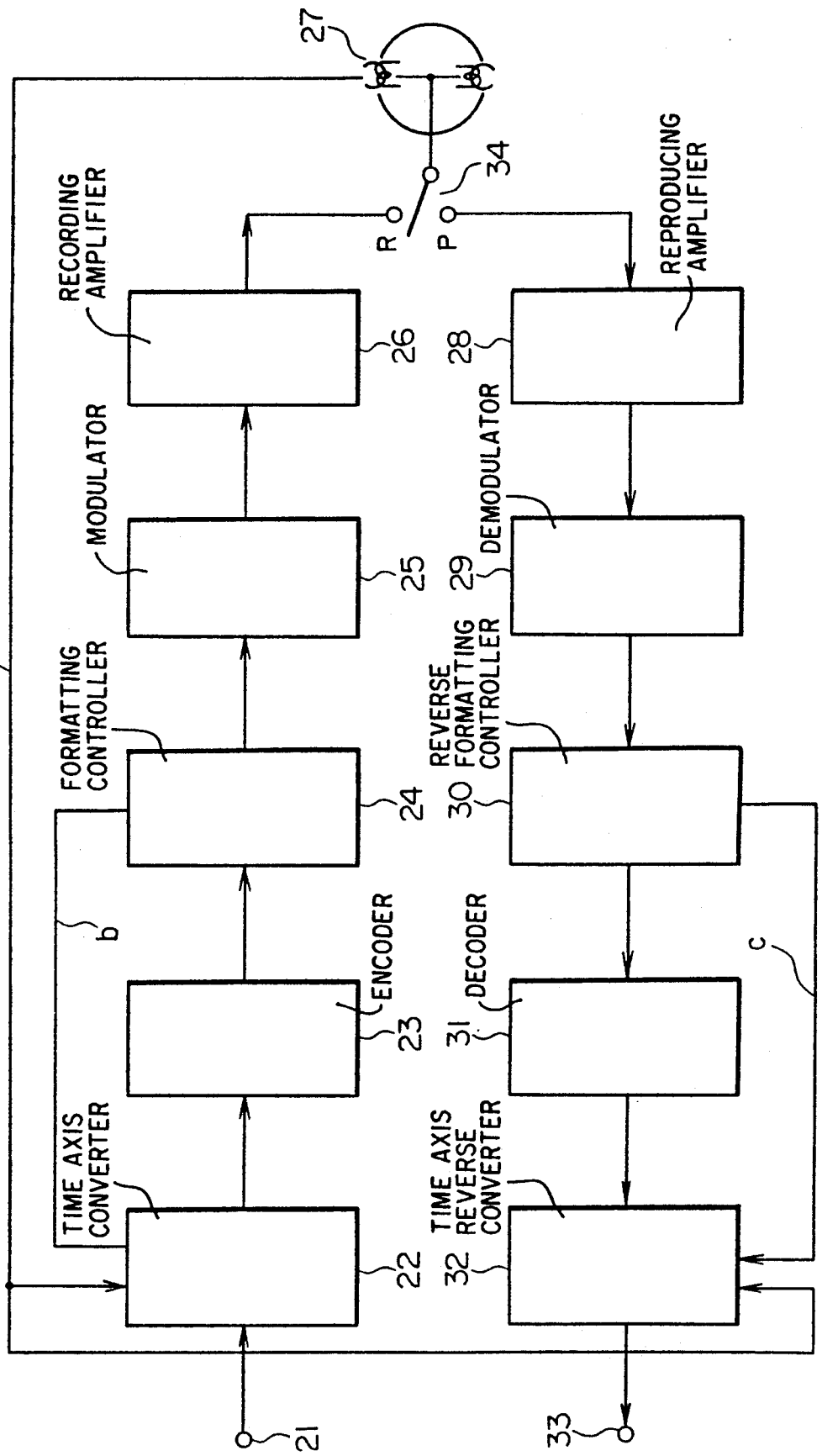
FIG. 3 shows a configuration of a prior art digital signal recording/reproducing apparatus.

FIG. 2 shows a configuration of the discriminator 13 of the first embodiment of the digital signal recording/reproducing apparatus. In FIG. 2, numeral 131 denotes an input terminal for the second rate discrimination signal c, numeral 132 denotes a first counter, numeral 133 denotes a second counter, numeral 134 denotes a first comparator, numeral 135 denotes an input terminal for the parity check error detection signal e, numeral 136 denotes a third counter, numeral 137 denotes a second comparator, numeral 138 denotes an AND gate, and numeral 139 denotes an output terminal for the third rate discrimination signal d.

The operation of the above digital signal recording/reproducing apparatus is now explained with reference to FIGS. 1 and 2.

The digital information signal having a sampling frequency of 48 kHz, applied to the input terminal 1 is sectioned to data frames having $800 + \alpha$ samples or $800 - \beta$ samples, by making reference to the head switching pulse a. As discussed in connection with the prior art, when the reproduced signal of the VTR is to be recorded as a video signal together with the digital information signal, the period of the vertical synchronization signal of the video signal includes a deviation of up to 0.5% in the worst condition. Thus, the head switching pulse a generated from the vertical synchronization signal of the video signal also includes a period error of 0.5%. Assuming that absorption ability to the period error of the head switching pulse is higher than 0.5%, for example 1%, than $\alpha$ and $\beta$ should be selected such that $$\frac{800 + \alpha}{800.8} \geq 1.01$$

$$\frac{800 - \beta}{800.8} \leq 0.99$$

The data frames having $800+\alpha$ samples and $800-\beta$ samples are called frame A and frame B, respectively. The 1-bit first discrimination signal b which represents the number of samples is "1" for the frame A and "0" for the frame B. The encoder 3 processes in the same manner as that of the prior art apparatus. The formatting control circuit 4 adds a header word including synchronization signal, block address, 1-bit rate discrimination bit, ID code and parity check code to each of the m data block in each data frame. The rate discrimination bit is "1" for the frame A, and "0" for the frame B. The parity check code represents the result of a predetermined logical operation for the block address and the ID code. The data output of the formatting controller 4 is supplied to the rotating head 7 through the modulator 5, the recording amplifier 6 and the switch 15 and recorded on a magnetic tape.

Figure 11:
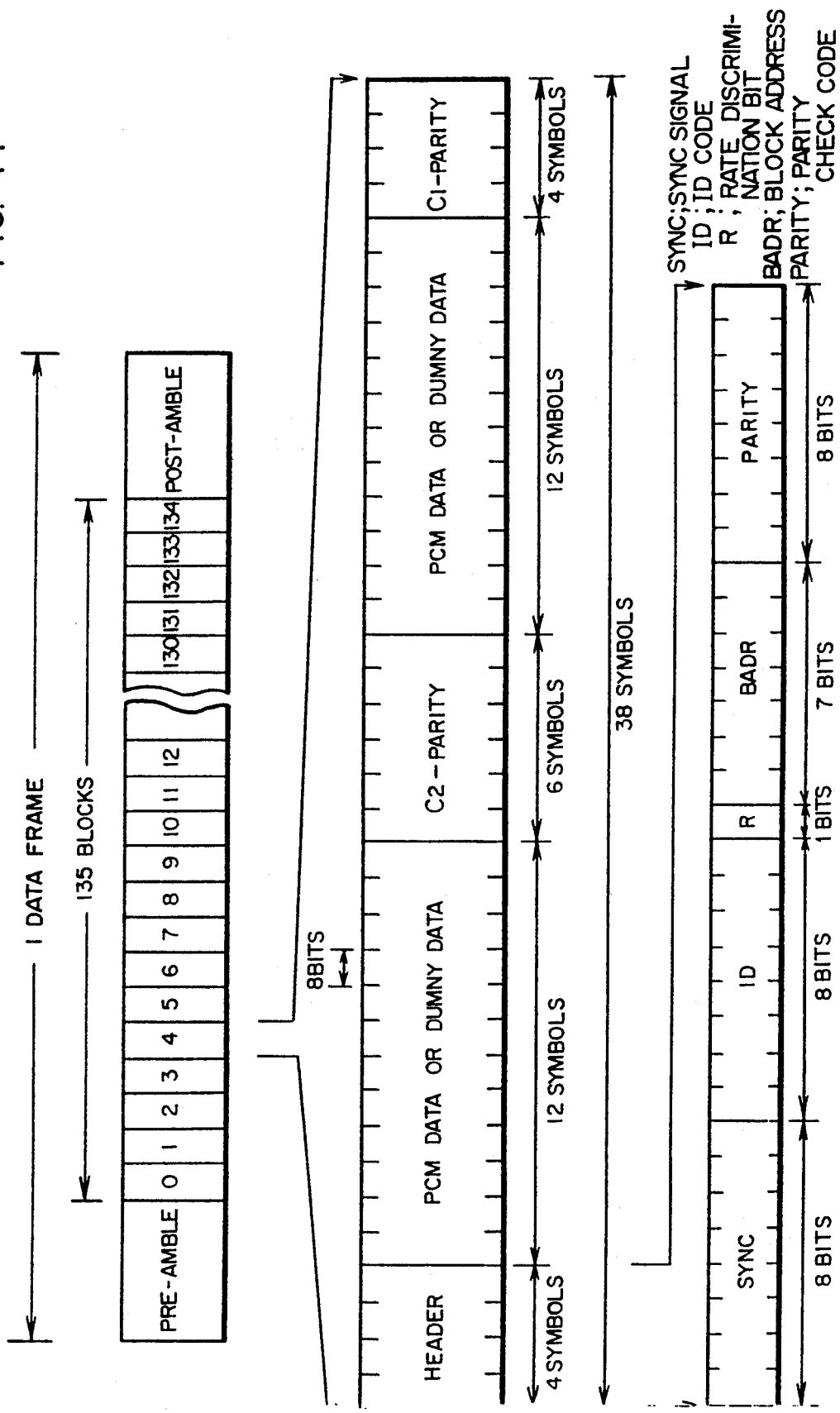
FIG. 11 shows recording conceptual view of one data frame.

FIG. 11 shows a recording conceptual view of one data frame recorded on the magnetic tape. One data frame comprises m=135 data blocks. Assuming that one sample of the digital information signal comprises 16 bits, six samples can be recorded in one data block in two channels. For the frame A, 6 samples $\times 135 = 810$ samples are recorded. For the frame B, dummy data is written in the three blocks having block addresses 0, 1 and 2, and 6 samples $\times (135-3) = 792$ samples are recorded.

In the reproduction mode, the signal reproduced by the rotating head 7 is supplied to the reverse formatting controller 10 through the switch 15, the reproducing amplifier 8 and the demodulator 9. The reverse formatting controller 10 detects the header word and the rate discrimination bit in the header word to produce the second rate discrimination signal c. It also detects the block address, the ID code and the parity check word in the header word. If the result of the predetermined logical operation for the block address and the ID code does not match to the parity check word, it produces a "0" signal, and if it matches, it produces a "1" signal, as the parity check error detection signal e. The discriminator 13 determines majority of the m second rate discrimination signals c and parity check error detection signals e for each data frame to produce the third rate discrimination signal d. The data output from the reverse formatting controller 10 and the decoder 11 is processed in the time axis reverse converter 12 by the third rate discrimination signal d in the reverse manner to that of the time axis converter 2.

The operation of the discriminator 13 is explained below. FIG. 2 shows a configuration of the discriminator 13. In FIG. 2, the number ml of "1" second rate discrimination signals of m second rate discrimination signals c in each data frame is counted by the first counter 132, and the number $m_0$ of "0" signals is counted by the second counter 133. When the parity check error detection signal e is "1", the second rate discrimination signal is not counted. The first comparator 134 compares $m_1$ and $m_0$, and if $m_1 > m_0$, it produces an "1" output, and if $m_1 \leq m_0$, it produces a "0" output. The third counter 136 counts the number of "1" bits in the m parity check error detection signals in each data frame. The second comparator 137 produces a "0" output if the count of the third counter 136 is larger than a predetermined value x. The outputs of the first comparator 134 and the second comparator 137 are logically operated by the AND gate 138 which produces the third rate discrimination signal d at the output terminal 139.

In accordance with the present embodiment, the numbers of "0" bits and "1" bits in the m second rate discrimination signals in each data frame are counted and the majority logic is conducted. Accordingly, a highly reliable third rate discrimination signal can be produced. If the number of times of the parity check errors in one data frame exceeds the predetermined number x, it is determined that the result of majority logic is questionable and the "0" third discrimination signal is forcibly produced by the AND gate 138. As a result, even if the rate is misdiscriminated, the introduction of the dummy data into the output digital information signal is prevented, and an audio signal with less noise can be reproduced.

While $800+\alpha$ samples and $800-\beta$ samples in one data frame are used and the rate discrimination signal is a one-bit signal in the above embodiment, four numbers of samples may be used and the rate discrimination signal may be a 2-bit signal.

Figure 6:
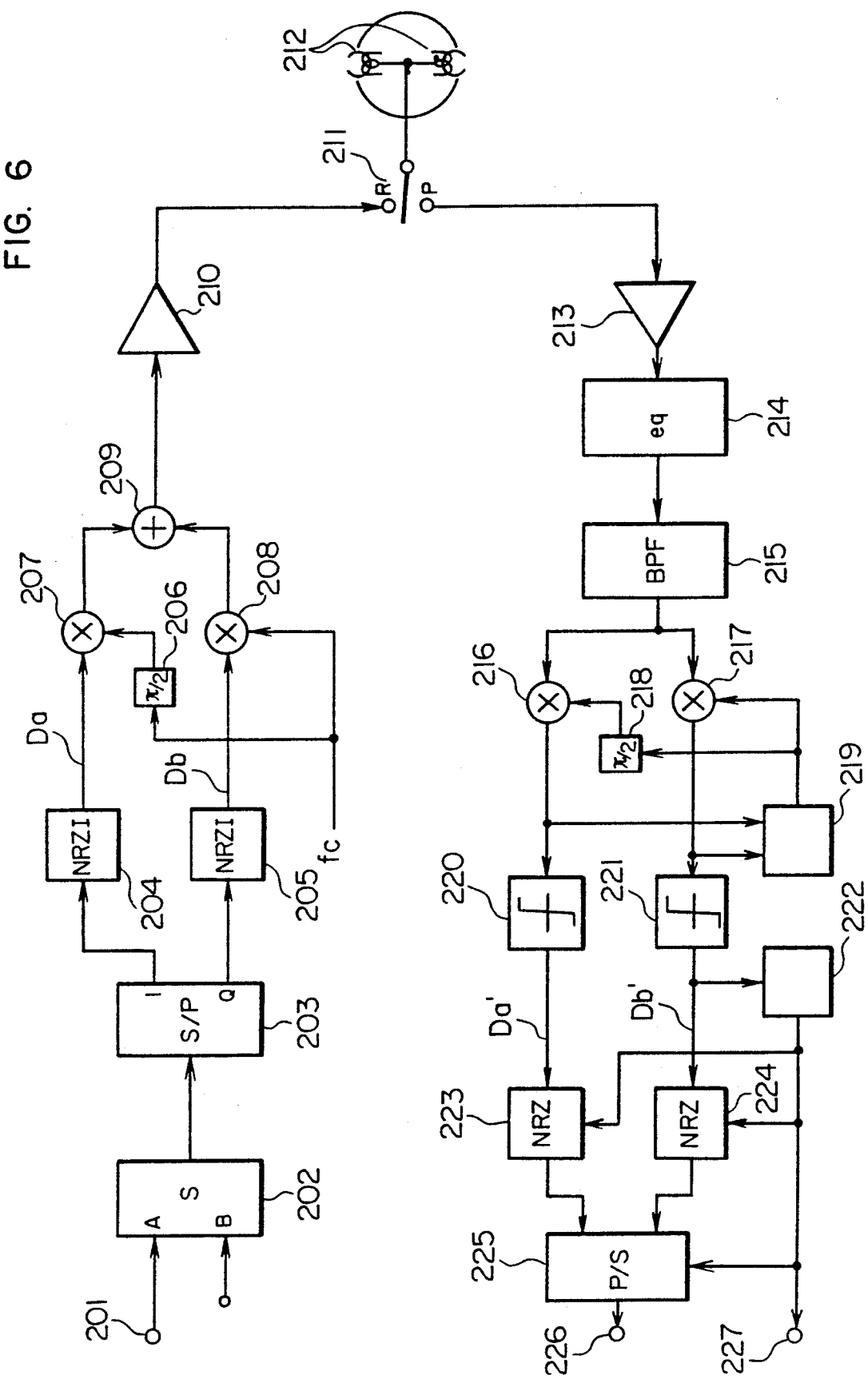
FIG. 6 shows a configuration of a second embodiment of the digital signal recording/reproducing apparatus of the present invention.

FIG. 6 shows a configuration of a second embodiment of the digital signal recording/reproducing apparatus of the present invention. In FIG. 6, numeral 201 denotes an input terminal for digital data, numeral 202 denotes a selector which receives a data pattern to be recorded and a fixed symbol pattern and switches them at a predetermined timing, numeral 203 denotes a serial/parallel converter for converting the output of the selector 202 to 2-bit parallel data, numerals 204 and 205 denote first and second NRZI converters for converting the 2-bit output of the serial/parallel converter 203 to NRZI codes, numerals 207 and 208 denote first and second balanced modulators for modulating the outputs of the first and second NRZI converters 204 and 205 by carriers having a 90° phase difference supplied from a first 90° phase shifter to attain four-phase modulation or offset four-phase modulation, numeral 109 denotes an adder for adding the outputs of the first and second balanced modulators, numeral 210 denotes a recording amplifier for amplifying the output of the adder 209, numeral 211 denotes a switch for selectively supplying the output of the recording amplifier to a pair of magnetic heads 212 on a rotating cylinder through a rotary transformer, numeral 213 denotes a reproducing amplifier for amplifying the signal reproduced by the magnetic head 212 when the signal recorded on the magnetic tape is reproduced, numeral 214 denotes an equalizer for equalizing the output of the reproducing amplifier 213, numeral 215 denotes a band-pass filter which receives the output of the equalizer 214 and passes a predetermined band around the center of the carrier frequency, numerals 216 and 217 denote first and second synchronous detectors which receive the output of the band-pass filter 215 and decode the four-phase modulated signal or the offset four-phase modulated signal, numeral 219 denotes a carrier reproducing circuit, numerals 220 and 221 denote first and second level detectors for detecting two output levels synchronously detected by two reproduced carriers having a 90° phase difference supplied from a second 90° phase shifter, numerals 223 and 224 denote first and second NRZ converters for NRZ-converting the outputs of the first and second level detectors 220 and 221, numeral 225 denotes a parallel/serial converter which receives the outputs of the first and second NRZ converters 223 and 224 and converts them to a serial signal, numeral 226 denotes a digital data output terminal, and numeral 227 denotes a reproduced data output terminal. Da and Db denote the outputs of the first and second NRZI converters 204 and 205, and Da' and Db' denote the outputs of the first and second level detectors 220 and 221.

The operation of the above digital signal recording-/reproducing apparatus is now explained with reference to FIG. 6.

Digital data applied to the digital data input terminal 201 at a predetermined timing is supplied to the selector 202, which selects the input B during the preample period. It selects the digital data during the data period. A fixed symbol pattern (ample pattern) applied to the input B may be a repetitive pattern of 8 bits (11000000). The output of the selector 202 is supplied to the serial/-parallel converter 203 which outputs odd-numbered bits to I and even-numbered bit to Q. The outputs I and Q of the serial/parallel converter 203 are applied to the first and second NRZI converters 204 and 205, respectively, for NRZI conversion. The first balanced modulator 207 balance-modulates the carrier phase-shifted by the first 90° phase shifter 206 with the output of the first NRZI modulator 204. The second balanced modulator 208 balance-modulates the carrier $f_c$ with the output of the second NRZI modulator 205. The outputs of the first and second balanced modulators 207 and 208 are mixed by the adder 209 and the mixed signal is recorded on a magnetic tape through the recording amplifier 210, switch 211 and magnetic head 212.

In the reproduction mode, the data recorded on the magnetic tape is supplied to the equalizer 214 through the magnetic head 212, switch 211 and reproducing amplifier 213 so that it is equalized in a predetermined manner. The band-pass filter 215 passes only a predetermined band width $f_c + f_B$ around the frequency $f_c$, of the output from the equalizer 214. The first synchronous detector 216 synchronously detects the output of the band-pass filter 215 with the output of the carrier regenerator 219 which oscillates at the same reproducing carrier frequency as the frequency $f_c$ and which has been phase-shifted by the second 90° phase shifter 218. The second synchronous detector 217 synchronously detects with the output of the carrier regenerator 219. The outputs of the first and second synchronous detectors 216 and 217 are supplied to the carrier regenerator 219 as phase error information. The outputs of the first and second synchronous detectors 216 and 217 are also supplied to the first and second level detectors 220 and 221 which reshape the waveforms and produce two different demodulation axis signals Da' and Db'. The signal Db' is supplied to the data clock reproducing circuit 222 which reproduces the data clock by using the reversal edge of the signal Db' as phase information.

The signals Da' and Db' are supplied to the first and second NRZ converters 223 and 224 for NRZ conversion, and the outputs thereof are parallel-to-serial converted by the parallel/serial converter 226, the output of which is supplied to the digital data output terminal 226.

Figure 4:
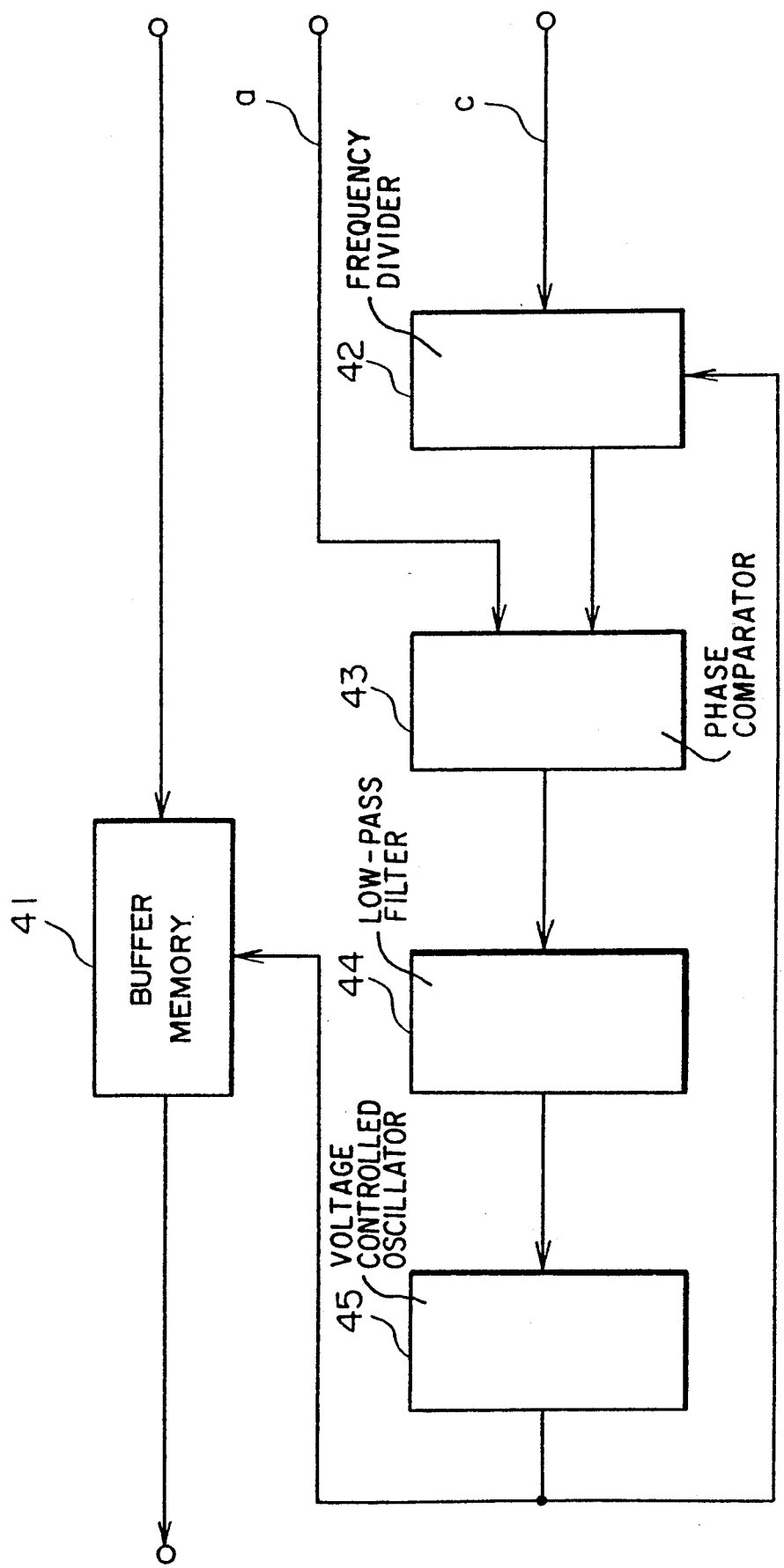
FIG. 4 is a recording conceptual view, FIG. 5 (a-d) shows a frequency spectrum chart.
Figure 5A:
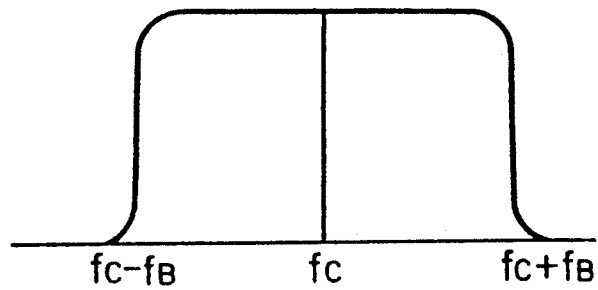
Figure 5B:
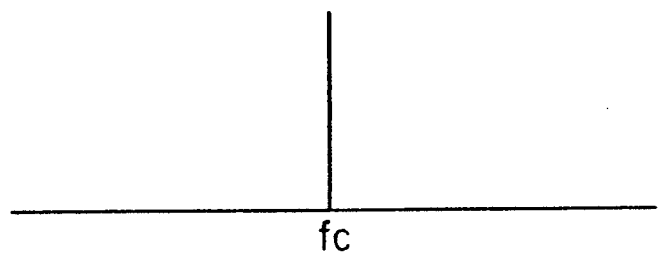
Figure 5C:
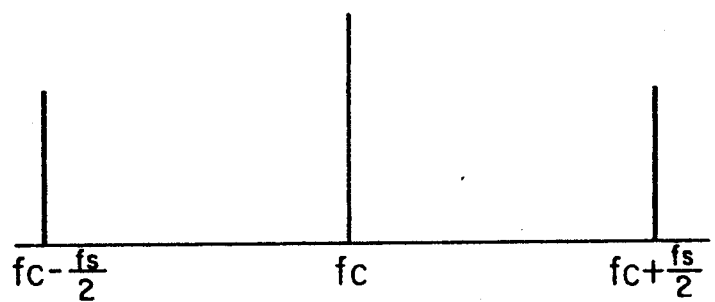
Figure 5D:
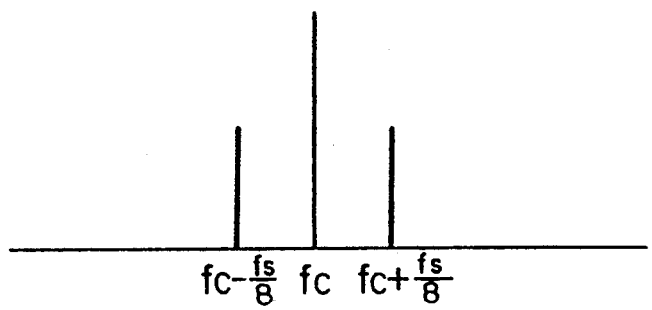

During the ample period, the fixed symbol pattern (11000000) which has been QPSK or O-QPSK modulated is recorded. Accordingly, the band width after the modulation spreads as shown in FIG. 4c. The band does not spread to a cutoff point of the band-pass filter 115 and a good demodulated signal is produced. In the output Db' of the second level detector 121, there are four possible demodulated signals Db' = ±Da or ±Db depending on the lock phase of the reproduced carrier. Since a "1" bit is present at the odd-numbered bit and the even-numbered bit, respectively, in the fixed symbol pattern (11000000), the signals Da and Db each have one several point for every four bits so that the reversal edge can always be detected.

Accordingly, during the preample period, the carrier and data clock can be simultaneously reproduced in a good manner.

Figure 7:
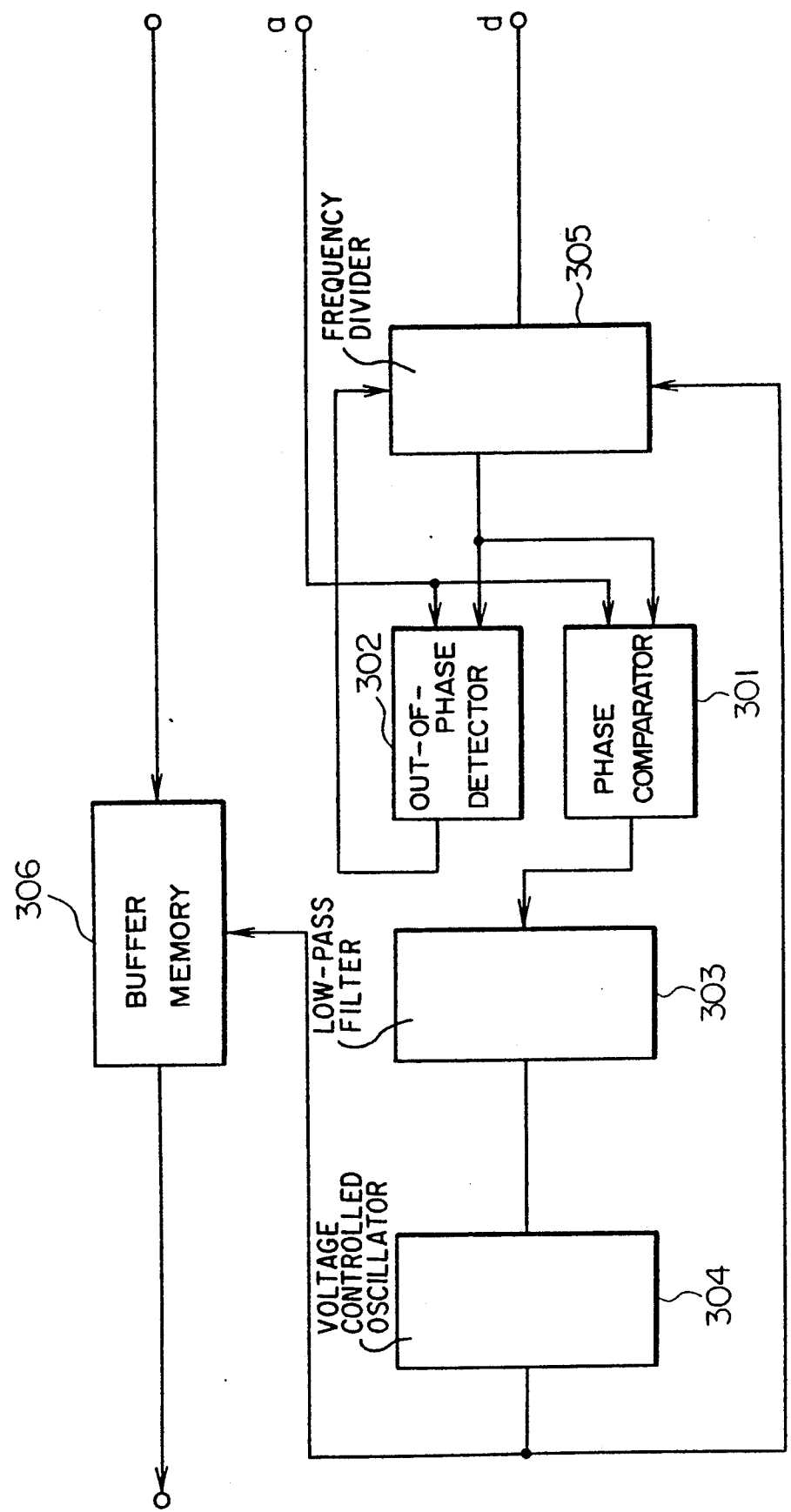
FIG. 7 shows a configuration of a time axis reverse converter in the first embodiment.

FIG. 7 shows a configuration of the time axis reverse converter 12 in the first embodiment of the digital signal recording/reproducing apparatus of the present invention. In FIG. 7, numeral 301 denotes a phase comparator, numeral 302 denotes an out-of-phase detector, numeral 303 denotes a low-pass filter, numeral 304 denotes a voltage controlled oscillator, numeral 305 denotes a frequency divider, and numeral 306 denotes a buffer memory.

The operation of the above time axis reverse converter is now explained.

The phase comparator 301 produces a voltage proportional to a phase difference between the head switching signal and the output of the frequency divider 305. A high frequency component thereof is eliminated by the low-pass filter 303. The voltage controlled oscillator 304 has the oscillation frequency thereof controlled by the output voltage of the low-pass filter 303, and the frequency divider 305 frequency-divides the output of the voltage controlled oscillator 304. The frequency division factor of the frequency divider 305 is determined by the third rate discriminator by the number of data in one data field. When the out-of-phase detector 302 detects out-of-phase, the count of the frequency divider 305 is cleared, and the clear is released at the next phase lock point so that the count of the frequency divider 305 is resumed.

Figure 8:
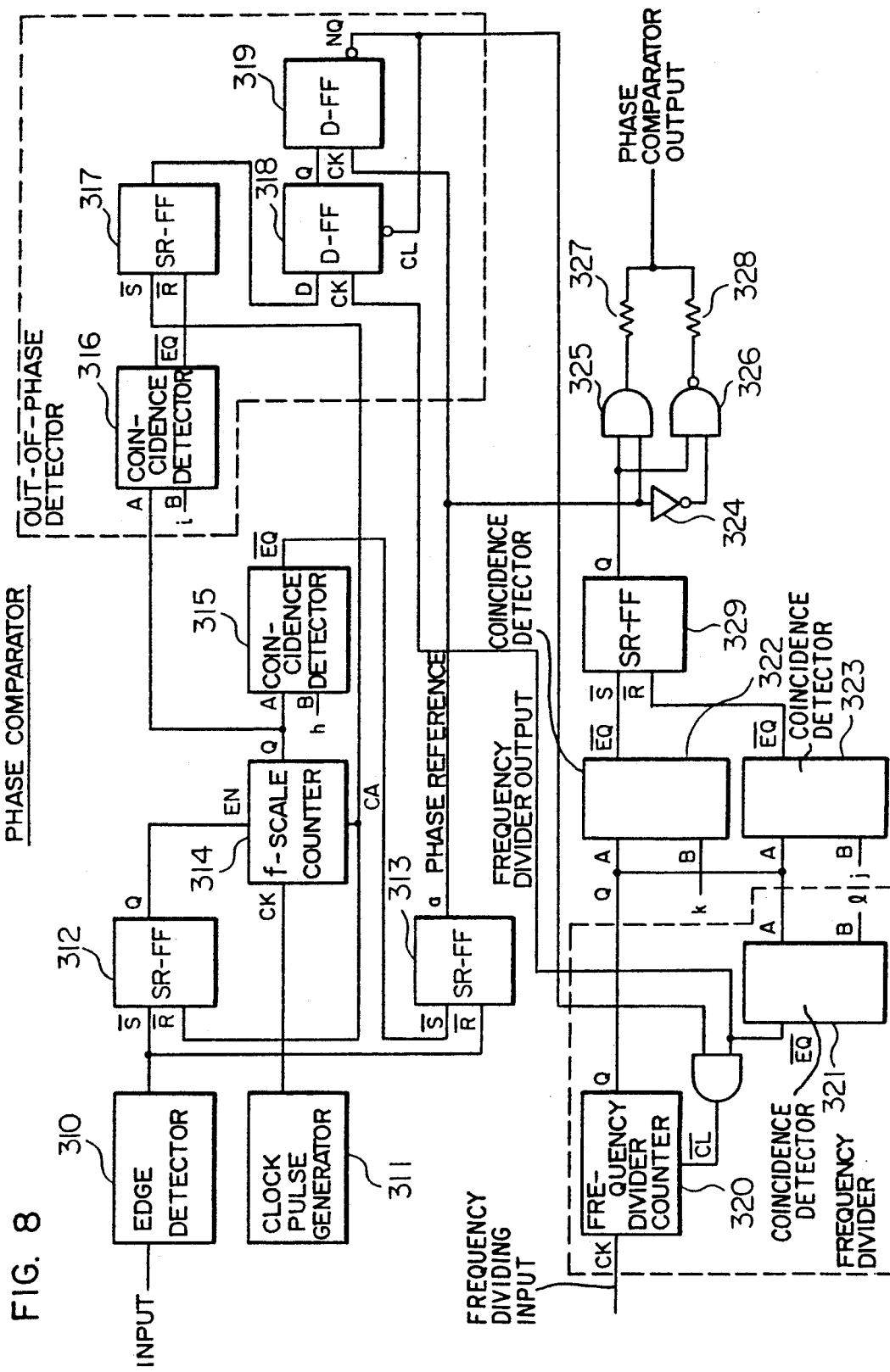
FIG. 8 shows a configuration of phase comparator, out-of-phase detector and frequency divider.

The operation of the phase comparator 301, out-of-phase detector 302 and frequency divider 305 is now explained in further detail. The detailed configuration of the phase comparator 301, out-of-phase detector 301 and frequency divider 305 is shown in FIG. 8. Numeral 310 denotes an edge detector, numeral 311 denotes a clock pulse generator, numeral 312 denotes an SR flip-flop, numeral 313 denotes an SR flip-flop, numeral 314 denotes an f-scale counter, numeral 315 denotes an coincidence detector, numeral 316 denotes an coincidence detector, numeral 317 denotes an SR flip-flop, numeral 318 denotes a D flip-flop, numeral 319 denotes a D flip-flop, numeral 320 denotes a frequency divider counter, numeral 321 denotes a coincidence detector, numeral 322 denotes a coincidence detector, numeral 323 denotes a coincidence detector, numeral 324 denotes an inverter, numeral 325 denotes an AND gate, numeral 326 denotes a NAND gate, numerals 327 and 328 denote resistors, and numeral 329 denotes an SR flip-flop.

Figure 9:
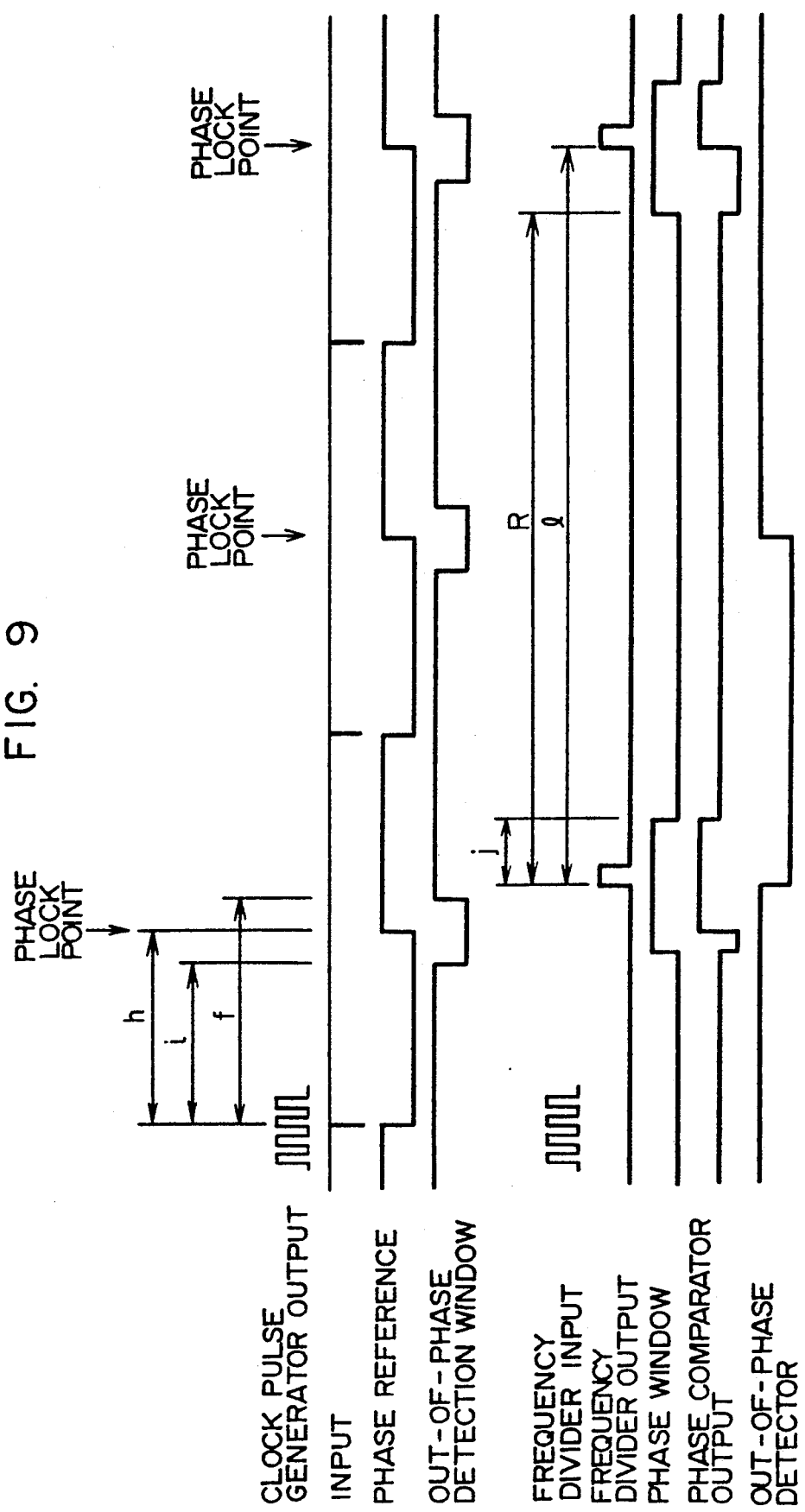
FIG. 9 shows a timing chart for explaining an operation of the phase comparator, out-of-phase detector and frequency divider.
Figure 10:
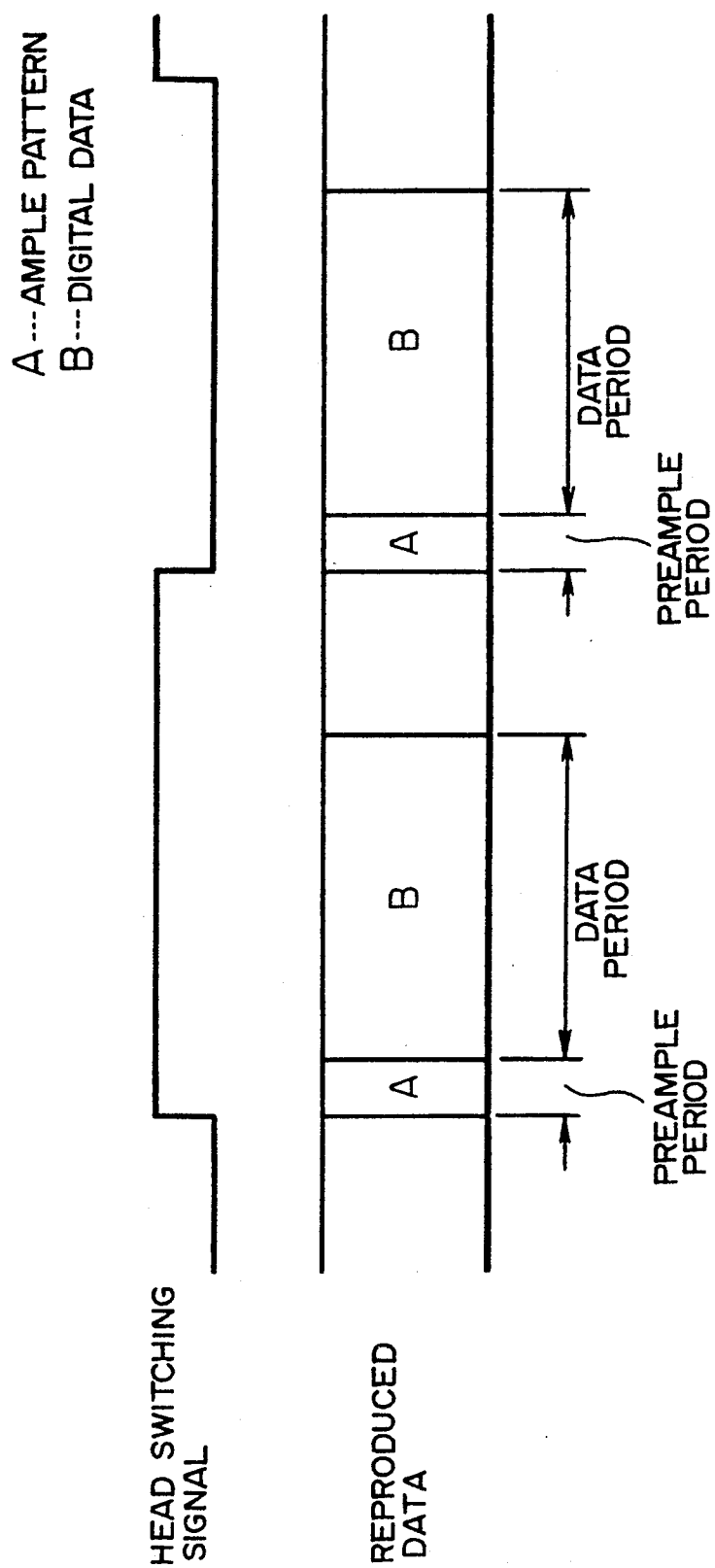
FIG. 10 shows data format of reproduced data.

FIG. 9 shows a timing chart for explaining the operation of the phase comparator 301, out-of-phase detector 302 and frequency divider 305. The operation of the phase comparator 301, out-of-phase detector 302 and frequency divider 305 is explained with reference to FIGS. 8 and 9.

As the edge detector 310 detects the edge of the head switching signal, it sets the SR flip-flop to enable the counter 314 and resets the SR flip-flop 313 to render the phase reference signal to "L". When the SR flip-flop 312 is set, the counter 314 starts to count the clock pulse generated by the clock pulse generator 311. When the count of the f-scale counter 314 reaches a preset count i, the coincidence detector 316 detects it to reset has the SR flip-flop 317 and renders the out-of-phase detection window to "L". When the count of the f-scale counter 314 reaches a preset count h, the coincidence detector 315 detects it and set the SR flip-flop 313 to render the phase reference to "H". When the f-scale counter 314 counts f and produces a carry CA, it sets the SR flip-flop 317 to render the out-of-phase detection window to "H" and resets the SR flip-flop 312 to stop the count of the f-scale counter.

On the other hand, the frequency divider counter 320 counts the clock generated by the voltage controlled oscillator. When the count reaches the preset count j, the coincidence detector 323 detects it and resets the SR flip-flop 329 to render the phase window to "L". When the count reaches a preset count k, it sets the SR flip-flop 329 to render the phase window to "H". When the count reaches the frequency division factor (, the coincidence detector 321 detects it and clears the frequency divider counter 320. The frequency division factor l is equal to the number of data in one data frame, which is determined by the third rate discrimination signal d.

In this manner, the phase reference and phase window are defined and they are supplied to the circuit comprising the inverter 324, AND gate 325, NAND gate 326 and resistors 327 and 328 to produce the phase comparator output. If the phase of the phase window advances to the rising edge (phase lock point) of the phase reference, the "L" period of the phase comparator output is extended, and if the phase of the phase window retards, the "H" period is extended.

The out-of-phase detection window which is the output of the SR flip-flop 317 is latched in the D flip-flop 318 by the frequency divider output. As a result, the rising edge of the frequency divider output goes beyond the "L" section of the out-of-phase window. As the phase of the frequency divider output greatly deviates from the phase lock point, the frequency divider counter 320 is cleared and the clear is released at the next rising edge of the phase reference. As a result, the point at which the frequency divider output rises when the frequency divider counter 320 next counts ( approaches to the next phase lock point.

Thus, the phase pull-in time at the start of operation can be reduced even with the phase synchronizing loop circuit which has a frequency divider of a large frequency division factor in the feedback loop.

We claim:

1. A digital signal recording/reproducing apparatus, comprising:

a time axis converter for receiving a digital information signal having a specific sampling frequency, sectioning the digital information signal by a predetermined period related to a vertical synchronization signal of a video signal to form the digital information signal of each predetermined period into a data frame having one of more than two different numbers of samples, adding a plurality of dummy data to a data frame having a smaller number of samples so that the number of samples matches the number of samples of a data frame having a maximum number of samples and producing a rate discrimination signal to represent the number of samples of the digital information signal in one data frame;

an encoder for receiving the data output of the time axis converter and encoding the data output with a predetermined error correction;

a formation controller for adding a header word including a synchronization signal and the rate discrimination signal to each of m data blocks in one data frame of the data output of said encoder;

a recorder including a modulator for modulating the output of said formatting controller with a predetermined modulation rule; and a reproducer including a demodulator for reversely processing to the functions of said recorder, a reverse formatting controller, a decoder and a time axis reverse converter;

the output of said recorder being recorded by a tape recorder rotating in synchronizing with the vertical synchronization signal of the video signal, and reproduced by said reproducer.

2. A digital signal recording/reproducing apparatus according to claim 1 wherein in recording a digital information signal having a specific sampling frequency $f_s$ together with a video signal having a vertical synchronization frequency $f_v$, the number N of samples of the digital information signal recorded in each field is set to one of $$N = [f_s/f_v] + \alpha$$

$$N = [f_s/f_v] - \beta$$

where $[f_s/f_v]$ represents an integer part, such that a mean number of samples recorded is equal to $f_s/f_v$, and $\alpha+\beta$ dummy data are recorded in the field having $[f_s/f_v]-\beta$ samples.

3. A digital signal recording/reproducing apparatus according to claim 2 wherein the digital information signal recorded in one field comprises m data blocks, where m is an integer and a discrimination signal indicating whether the number of recorded samples in one field of the digital information signal is $[f_s/f_v]+\alpha$ or $[f_s/f_v]-\beta$ is recorded in each data block.

4. A digital signal recording/reproducing apparatus according to claim 2 wherein the $\alpha+\beta$ dummy data in the field having $[f_s/f_v]-\beta$ samples are recorded in a predetermined fixed position in the field.

5. A digital signal recording/reproducing apparatus, comprising:

a time axis converter for receiving a digital information signal having a specific sampling frequency, sectioning the digital information signal by a predetermined period related to a vertical synchronization signal of a video signal to form the digital information signal of each predetermined period into a data frame having one of at least two different numbers of samples, adding a plurality of dummy data to a data frame having a smaller number of samples so that the number of samples matches the number of samples of a data frame having a maximum number of samples and producing a rate discrimination signal to represent the number of samples of the digital information signal in one data frame;

an encoder for receiving the data output of the time axis converter and encoding the data output with a predetermined error correction;

a formatting controller for adding a header word including a synchronization signal and the rate discrimination signal to each to m data blocks in one data frame of the data output of said encoder;

a recorder including a modulator for modulating the output of said formatting controller with a predetermined modulation rule; and a reproducer including a demodulator for reversely processing to the functions of said recorder, a reverse formatting controller, a decoder and a time axis reverse converter;

the output of said recorder being recorded by a tape recorder rotating in synchronism with the vertical synchronization signal of the video signal, and reproduced by said reproducer, wherein said reverse formatting controller performs a majority logic operation on the m rate discrimination signals extracted from the m header words in the one data frame to discriminate the number of samples in the data frame, and when the result of the majority logic operation is questionable, discriminates the data frame as a data frame having a minimum number of samples.

6. A digital signal recording/reproducing apparatus, comprising:

a time axis converter for receiving a digital information signal having a specific sampling frequency, sectioning the digital information signal by a predetermined period related to a vertical synchronization signal of a video signal to form the digital information signal of each predetermined period into a data frame having one of at least two different numbers of samples, adding a plurality of dummy data to a data frame having a smaller number of samples so that the number of samples matches the number of samples of a data frame having a maximum number of samples and producing a rate discrimination signal to represent the number of samples of the digital information signal in one data frame;

an encoder for receiving the data output of the time axis converter and encoding the data output with a predetermined error correction;

a formatting controller for adding a header word including a synchronization signal and the rate discrimination signal to each of m data blocks in one data frame of the data output of said encoder;

a recorder including a modulator for modulating the output of said formatting controller with a predetermined modulation rule; and a reproducer including a demodulator for reversely processing to the functions of said recorder, a reverse formatting controller, a decoder and a time axis reverse converter;

the output of said recorder being recorded by a tape recorder rotating in synchronism with the vertical synchronization signal of the video signal, and reproduced by said reproducer, wherein said formatting controller produces a predetermined fixed pattern during a predetermined sample period including a head switching point of a helical scan type tape recorder, and time-compresses the m data block header words during a data period other than the sample period, said modulator includes a serial/parallel converter for converting the output of said formatting controller to 2-bit parallel data, first and second NRZI converters for NRZI-converting the 2-bit output of the serial/parallel converter and a QPSK modulator for four-phase modulating or offset four-phase modulating the outputs of the first and second NRZI converters, and said fixed pattern is a repetition of an n-bit pattern having one "1" bit at each of an odd-numbered bit position and an even-numbered bit position and "0" bits at all of the remaining bit positions.

7. A digital signal recording/reproducing apparatus, comprising:

a time axis converter for receiving a digital information signal having a specific sampling frequency, sectioning the digital information signal by a predetermined period related to a vertical synchronization signal of a video signal to form the digital information signal of each predetermined period into a data frame having one of at least two different numbers of samples, adding a plurality of dummy data to a data frame having a smaller number of samples so that the number of samples matches the number of samples of a data frame having a maximum number of samples and producing a rate discrimination signal to represent the number of samples of the digital information signal in one data frame:

an encoder for receiving the data output of the time axis converter and encoding the data output with a predetermined error correction;

a formatting controller for adding a header word including a synchronization signal and the rate discrimination signal to each of m data blocks in one data frame of the data output of said encoder;

a recorder including a modulator for modulating the output of said formatting controller with a predetermined modulation rule; and a reproducer including a demodulator for reversely processing to the functions of said recorder, a reverse formatting controller, a decoder and a time axis reverse converter;

the output of said recorder being recorded by a tape recorder rotating in synchronism with the vertical synchronization signal of the video signal, and reproduced by said reproducer, wherein said time axis reverse converter includes a phase synchronization loop for receiving a head switching signal of a helical scan type recorder and the number of samples in the data frame discriminated by the reverse formatting controller to produce a read clock, and a buffer memory for receiving the digital information signal having error thereof corrected by said decoder to produce an output at a timing of the read clock supplied from the phase synchronization loop.

8. A digital signal recording/reproducing apparatus according to claim 7, wherein said phase synchronization loop includes a phase comparator for comparing phases of the head switching signal and an output signal of a frequency divider, an out-of-phase detector for detecting when a phase difference between the head switching signal and the output signal of the frequency divider is larger than a predetermined level, a low-pass filter for limiting a band width of the output of said phase comparator, a voltage controlled oscillator having an oscillation frequency thereof controlled by the output voltage of said low-pass filter for supplying the oscillation frequency to a frequency divider, the frequency divider for determining a frequency division factor in accordance with the discrimination of the number of samples in the data frame supplied by said reverse formatting controller, and frequency-dividing the output of said voltage controlled oscillator, and a clear controller for the frequency divider.

9. A digital signal recording/reproducing apparatus according to claim 8, wherein said frequency divider includes a counter having a clear input for counting the output of the voltage controlled oscillator, and a coincidence detector for comparing an output of the counter with the frequency division factor and clears the counter when they are equal.

10. A digital signal recording/reproducing apparatus according to claim 9, wherein said phase comparator includes an edge detector for detecting an edge of an input signal, a first SR flip-flop adapted to be reset by the output of said edge detector and set by a carry output of an f-scale counter enabled by said first SR flip-flop to count a clock generated by a clock pulse generator, a first coincidence detector for comparing the output of the f-scale counter with a constant a as a phase reference width and setting a second SR flip-flop when both are equal, the second SR flip-flop adapted to be reset by the output of the edge detector and set by the output of the first coincidence detector, a second coincidence detector for comparing the output of the frequency divider counter with a constant d and setting a third SR flip-flop when both are equal, a third coincidence detector for comparing the output of the frequency divider counter with a constant c and resetting the third SR flip-flop when both are equal, the third SR flip-flop adapted to be set by the output of the second coincident detector and reset by the output of the third coincidence detector, and AND gate for ANDing the output of the second SR flip-flop and the output of the third SR flip-flop, an invertor for inverting the output of the second SR slip-flop, a NAND gate for NANDing the output of the invertor and the output of the second SR slip-flop, a resistor inserted between the AND gate and the phase comparator output terminal, and a resistor inserted between the output of the NAND gate and the phase comparator output terminal.

11. A digital signal recording/reproducing apparatus according to claim 10, wherein said out-of-phase detector includes a coincidence detector for comparing the output of the f-scale counter of the phase comparator with a constant b and resetting an SR flip-flop when both are equal, the SR flip-flop adapted to be reset by the output of the coincidence detector and set by the carry output of the f-scale counter, a D flip-flop for latching the output of the SR flip-flop by the output of the coincidence detector of the frequency divider or the frequency divider output and adapted to be cleared by an inverted output of a second D flip-flop, and the second D flip-flop for latching the output of the first D flip-flop by the output of the second SR flip-flop of the phase comparator or the phase reference.

* * * * *